United States Patent
Morishita et al.

(10) Patent No.: US 11,002,312 B2
(45) Date of Patent: May 11, 2021

(54) MOTOR AND FAN MOTOR (71) Applicant: Nidec Corporation, Kyoto (JP)

(72) Inventors: Hiroshi Morishita, Kyoto (JP); Kunio Sakurada, Kyoto (JP); Hirotaka Tamekuni, Kyoto (JP); Takeru Omura, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 128 days.

(21) Appl. No.: 16/293,886

(22) Filed: Mar. 6, 2019

(65) Prior Publication Data
US 2019/0285116 A1 Sep. 19, 2019

(30) Foreign Application Priority Data

Mar. 13, 2018 (JP) .............................. JP2018-044875

(51) Int. Cl.
*F16C 32/04* (2006.01)
*H02K 5/16* (2006.01)
*F16C 32/06* (2006.01)
*F16C 17/02* (2006.01)
F04D 29/054 (2006.01)
F04D 25/10 (2006.01)

(52) U.S. Cl.
CPC .......... *F16C 32/0402* (2013.01); *F16C 17/02* (2013.01); *F16C 32/0625* (2013.01); F04D 25/105 (2013.01); F04D 29/054 (2013.01)

(58) Field of Classification Search
CPC ...... F16C 17/02; F16C 17/026; F16C 17/107; F16C 32/0402; F16C 32/06; F16C 32/0625; F16C 32/0633; F16C 33/74; F16C 33/107; F16C 33/726; F16C 33/745; F04D 25/062; B41J 2/471; G11B 19/2036; H02K 7/08; H02K 5/1675
See application file for complete search history.

(56) References Cited

U.S. PATENT DOCUMENTS

2015/0167682 A1* 6/2015 Ishihara ................... H02K 5/10
417/354

FOREIGN PATENT DOCUMENTS

| GB | 2246176 | * | 7/1990 |
| JP | 07-230056 A | | 8/1995 |
| JP | 11-305161 A | | 11/1999 |
| JP | 2006292135 | * | 10/2006 |

* cited by examiner

Primary Examiner — Tran N Nguyen
(74) Attorney, Agent, or Firm — Keating & Bennett (57) ABSTRACT In an aerodynamic bearing, an outer peripheral surface of a shaft and an inner peripheral surface of a sleeve face each other in a radial direction. The sleeve includes a through hole penetrating the sleeve in the radial direction. A space on a radially inner side of the sleeve communicates with an external space of a motor through the through hole. A stationary portion includes a wall portion radially overlapping the through hole with a gap interposed therebetween on a radially outer side of the through hole.

12 Claims, 8 Drawing Sheets

MOTOR AND FAN MOTOR

CROSS REFERENCE TO RELATED APPLICATION

This application claims the benefit of priority to Japanese Patent Application No. 2018-044875 filed on Mar. 13, 2018. The entire contents of this application are hereby incorporated herein by reference.

1. FIELD

The present disclosure relates to a motor and a fan motor including the motor and an impeller.

2. DESCRIPTION OF THE RELATED ART

Conventionally, motors using aerodynamic bearings have been known. A rotating member of the motor is rotatably supported to a stationary member through an aerodynamic bearing. A slight gap is provided between the rotating member and the stationary member at a part where the aerodynamic bearing is formed. A dynamic pressure-generating groove is provided on a surface of at least one of the rotating member and the stationary member that form the gap. Further, a connection hole that communicates the gap and the outside of the motor is provided. When the motor is driven, dynamic pressure is generated by the dynamic pressure-generating groove while gas is supplied to the gap from outside the motor through the communication hole. The structure of a motor using a conventional aerodynamic bearing is described in JP H11-305161 A, for example.

In this motor, herringbone grooves are formed on an outer peripheral surface of a fixed shaft inserted into a hollow space inside a hollow rotating shaft. When the motor is driven, air is supplied to a gap between the fixed shaft and the hollow rotating shaft, through an inlet provided in a lower end part of the hollow rotating shaft. This increases pressure, and the herringbone grooves generate dynamic pressure, so that the fixed shaft, the hollow rotating shaft, and the herringbone grooves function as a bearing. In addition, a portion of a part protruding from a base for fixing a stator is disposed in the air inlet. As a result, entry of dust or water droplets into the above-mentioned gap through the air inlet is suppressed. However, if the above-described structure in which the base supporting the stator is disposed in a limited space near the bearing is applied, it may be impossible to ensure sufficient magnetic space for disposing the stator and a magnet, or to ensure sufficient bearing space for supporting a rotating part. It is also difficult to further reduce size and improve performance of the motor.

SUMMARY

An example embodiment of the present disclosure is a motor including a stationary portion including a stator, and a rotating portion supported so as to be rotatable about a vertically extending center axis relative to the stationary portion through an aerodynamic bearing. The rotating portion includes a shaft disposed along the center axis, and a magnet facing the stator. The stationary portion includes a sleeve including an outer peripheral surface on which the stator is fixed directly or indirectly, and extending axially in a cylindrical shape around the shaft. In the aerodynamic bearing, an outer peripheral surface of the shaft and an inner peripheral surface of the sleeve face each other in the radial direction, and the sleeve includes a through hole penetrating the sleeve in the radial direction. A space on the radially inner side of the sleeve communicates with an external space of the motor through the through hole, and the stationary portion includes a wall portion radially overlapping the through hole with a gap interposed therebetween on the radially outer side of the through hole.

The above and other elements, features, steps, characteristics and advantages of the present disclosure will become more apparent from the following detailed description of example embodiments with reference to the attached drawings.

DETAILED DESCRIPTION OF THE EXAMPLE EMBODIMENTS

Example embodiments of the present disclosure will be described below with reference to the drawings. In the present disclosure, a direction parallel to the center axis of a later-mentioned motor, a direction perpendicular to the center axis of the motor, and a direction extending along a circular arc around the center axis of the motor are referred to as the "axial direction," the "radial direction," and the "circumferential direction," respectively. Also in the present disclosure, the axial direction is referred to as the vertical direction, and a rotating part side of a later-mentioned base member is referred to as the upper side to describe the shapes and positional relations of parts. Note, however, that the definition of the vertical direction is not intended to limit orientations of a motor and a fan motor according to the present disclosure when in use. In addition, in the present disclosure, "parallel direction" includes a substantially parallel direction. In addition, in the present disclosure, "perpendicular direction" includes a substantially perpendicular direction.

Figure 1:
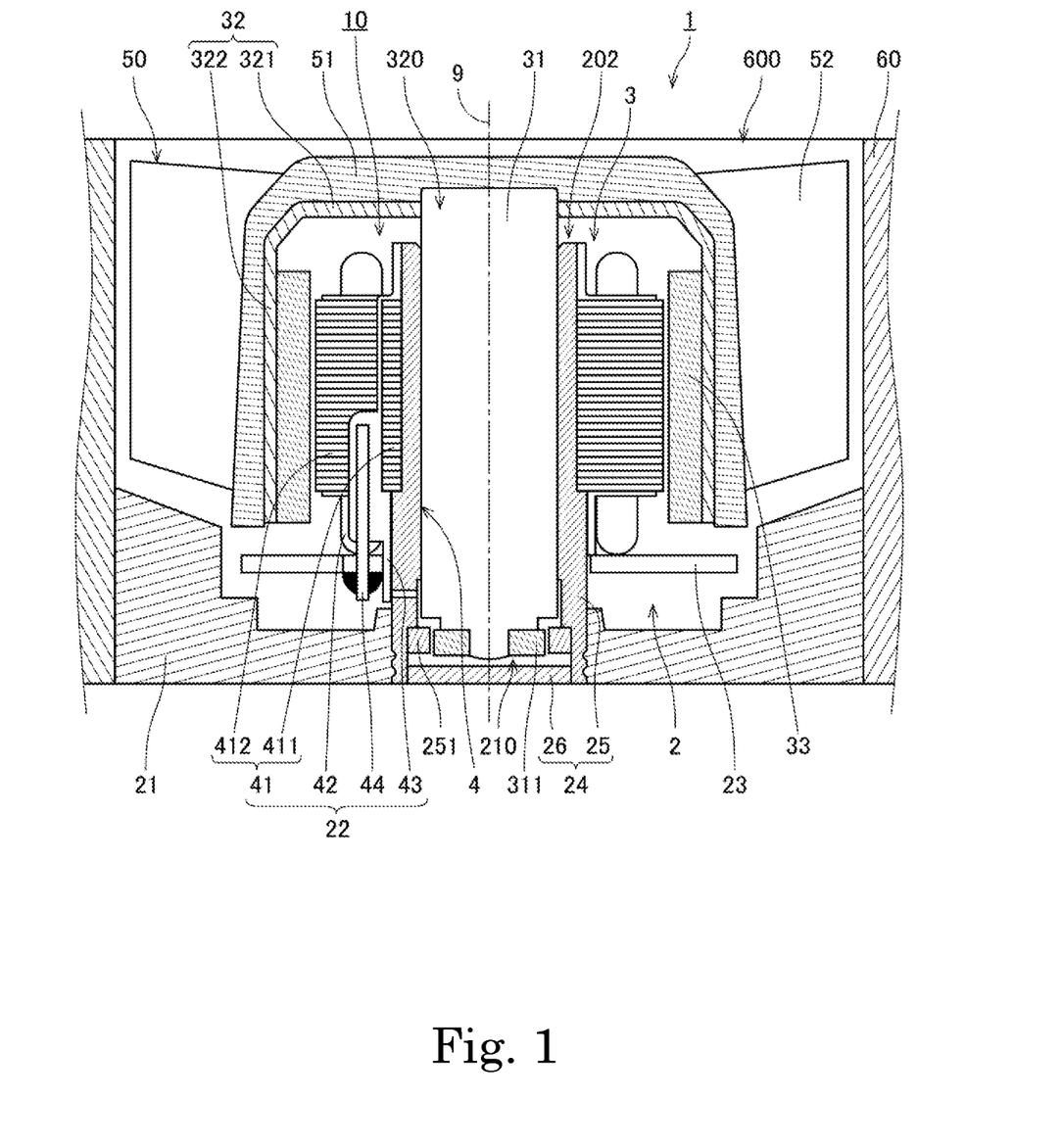
FIG. 1 is a longitudinal sectional view of a fan motor according to a first example embodiment of the present disclosure.

A fan motor 1 according to a first example embodiment of the present disclosure is mounted inside a housing of a laptop, for example, and is used as a device for supplying an airflow for cooling. Note, however, that the fan motor 1 may be used as a device for supplying an air flow for cooling to a space such as a household electrical appliance such as a refrigerator, a high-temperature appliance such as a vehicle headlight, or a server system in which multiple electronic devices are disposed. FIG. 1 is a longitudinal sectional view of the fan motor 1 according to the first example embodiment of the present disclosure. As shown in FIG. 1, the fan motor 1 has a motor 10, an impeller 50, and a housing 60.

Next, the configuration of the motor 10 will be described. The motor 10 is a device that rotates the impeller 50 according to the drive current. As shown in FIG. 1, the motor 10 has a stationary part 2 and a rotating part 3. The stationary part 2 is fixed to the housing 60 and is stationary relative to the housing 60. The rotating part 3 is supported so as to be rotatable about a vertically extending center axis 9 relative to the stationary part 2, through a later-mentioned aerodynamic bearing 4.

The stationary part 2 has a base member 21, a stator 22, a circuit board 23, and a bearing part 24.

The base member 21 is a plate-like member that spreads in the radial direction below the stator 22 and the circuit board 23. Resin is used as the material of the base member 21, for example. Note, however, that metal may be used as the material of the base member 21 instead. The base member 21 has a through hole 210 that axially penetrates the base member 21 around the center axis 9. The base member 21 is fixed to the later-mentioned housing 60 by screwing, for example. Note, however, that the base member 21 may be formed as a single member integrated with the housing 60.

The stator 22 is an armature having a stator core 41, multiple coils 42, an insulator 43, and a binding pin 44. The stator 22 is positioned above at least a part of the base member 21. The stator core 41 is a laminated steel plate in which magnetic steel sheets such as silicon steel plates are laminated in the axial direction, for example. The stator 22 including the stator core 41 is indirectly supported on the base member 21, by being directly fixed to an outer peripheral surface of a later-mentioned sleeve 25 with an adhesive, for example. Note that the stator 22 may be indirectly fixed to the outer peripheral surface of the later-mentioned sleeve 25 through a different member (not shown).

The stator core 41 has an annular core back 411 and multiple teeth 412 protruding radially outward from the core back 411. The insulator 43 is used to insulate wires forming the later-mentioned multiple coils 42 from the stator core 41. The insulator 43 covers at least a part of the surface of the stator core 41. In addition, the insulator 43 is positioned on the radially outer side of the later-mentioned sleeve 25. Resin which is an insulator is used as the material of the insulator 43. A detailed configuration of the insulator 43 will be described later. The multiple coils 42 are an aggregate of wires wound around the multiple teeth 412 through the insulator 43. The multiple teeth 412 and the multiple coils 42 are preferably arranged in a circumferential direction around the center axis 9, at substantially equal intervals in an annular shape.

The circuit board 23 is positioned below at least a part of the stator 22, and is disposed substantially perpendicular to the center axis 9. Further, the circuit board 23 is positioned axially above a later-mentioned through hole 250 of the sleeve 25. The circuit board 23 is fixed near a lower end part of the insulator 43 by welding, for example. The circuit board 23 is electrically connected to the stator 22. An electric circuit that supplies a drive current to the coil 42 is mounted on the circuit board 23. Ends of the wires forming the coil 42 are electrically connected to the electric circuit of the circuit board 23. The drive current of the motor 10 is supplied to the coil 42 from an external power supply (not shown) through the circuit board 23 and the wires.

The binding pin 44 of the stator 22 is used to facilitate connection of the wires forming the coil 42 to the circuit board 23, and to suppress poor connection. An end of the wire drawn out from the coil 42 is tied to the binding pin 44. A lower end part of the binding pin 44 is electrically connected to the circuit board 23, and is fixed to the circuit board 23 by soldering. In addition, the insulator 43 cylindrically covers a part of an outer peripheral surface of the binding pin 44. As a result, it is possible to support the binding pin 44, and prevent a withstand voltage failure due to short-circuit between the binding pin 44 and the coil 42 other than the end of the wire wound around the binding pin 44.

The bearing part 24 is a part that supports a later-mentioned shaft 31 in a rotatable manner. Metal is used as the material of the bearing part 24, for example. The bearing part 24 has the sleeve 25 that extends axially in a cylindrical shape around the shaft 31, and a disk-shaped cap 26 that closes an opening in a lower end part of the sleeve 25. An inner peripheral surface of the sleeve 25 faces the outer peripheral surface of the shaft 31 in the radial direction. A lower part of the sleeve 25 is inserted into the through hole 210 of the base member 21 and is fixed to the base member 21 by an adhesive, for example.

A sleeve-supporting magnet 251 is fixed to the inner peripheral surface of the lower part of the sleeve 25 with an adhesive, for example. The sleeve-supporting magnet 251 is disposed in an annular shape around the center axis 9. The inner peripheral surface of the sleeve-supporting magnet 251 is a pole face in which the north pole and the south pole are arranged in the axial direction. The inner peripheral surface of the sleeve-supporting magnet 251 faces an outer peripheral surface of a later-mentioned shaft-supporting magnet 311 in the radial direction.

Figure 2:
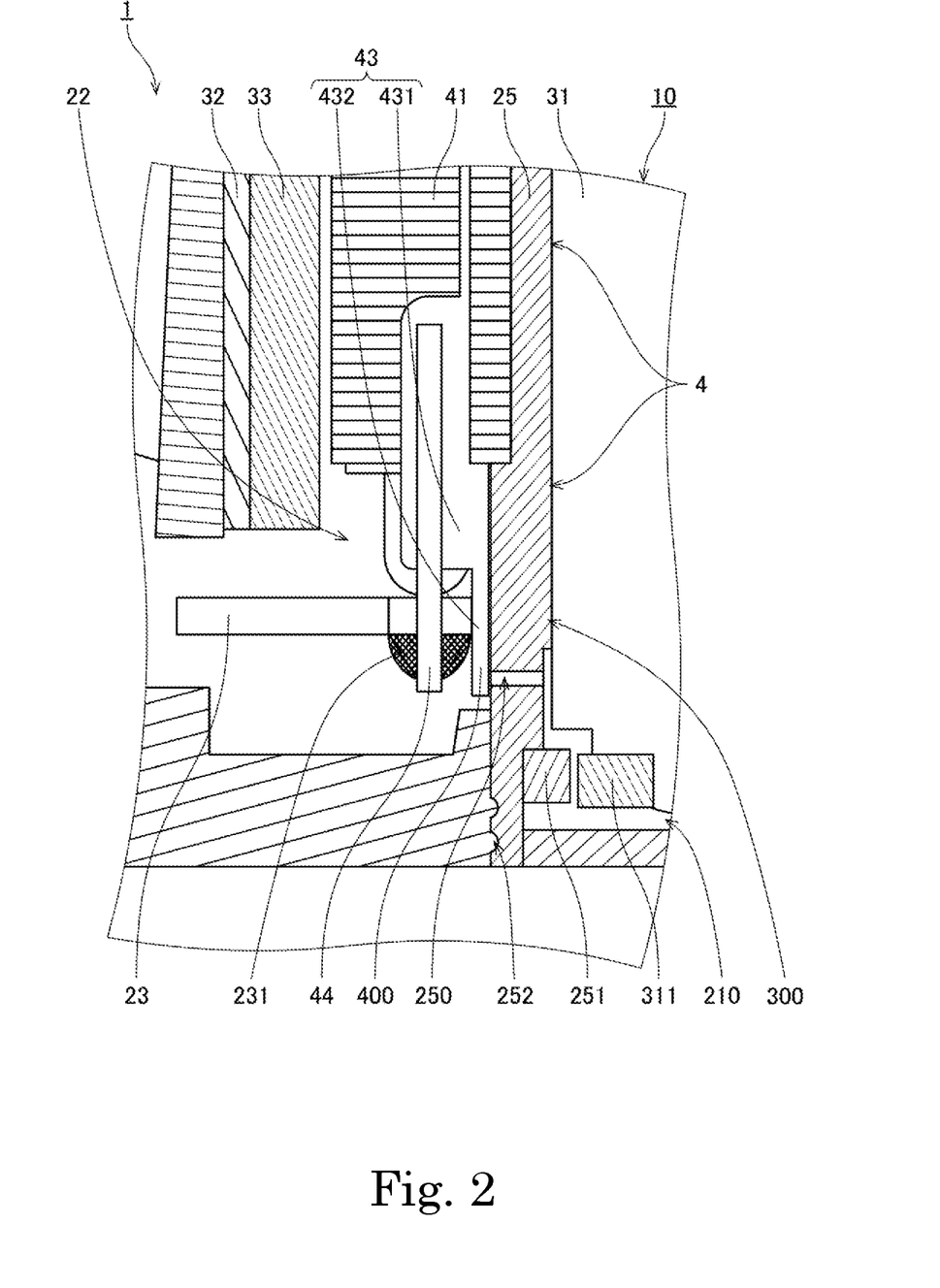
FIG. 2 is a partial longitudinal sectional view of the fan motor according to the first example embodiment of the present disclosure.

FIG. 2 is a partial longitudinal sectional view of the fan motor 1. As shown in FIG. 2, the sleeve 25 has the through hole 250 penetrating the sleeve 25 in the radial direction axially above the sleeve-supporting magnet 251. A space positioned on the radially inner side of the sleeve 25 and on the radially outer side of the later-mentioned shaft 31 communicates with the external space of the motor 10 and the fan motor 1 through the through hole 250. When the motor 10 is driven, gas flows into the space on the radially inner side of the sleeve 25 from the external space through the through hole 250. Note, however, that the axial position of the through hole 250 may be any position where the through hole 250 does not radially overlap the adjacent base member 21, stator 22, and sleeve-supporting magnet 251, and is not limited to the position shown in FIGS. 1 and 2. Further, in the example embodiment, the sleeve 25 is provided with one through hole 250. Note, however, that the sleeve 25 may be provided with two or more through holes 250.

The rotating part 3 has the shaft 31, a rotor hub part 32, and a drive magnet 33.

The shaft 31 is a columnar member axially extending and disposed along the center axis 9. The shaft 31 may be integrated with the rotor hub part 32 or may be a separate member. Metal such as stainless steel is used as the material of the shaft 31, for example. The outer peripheral surface of the shaft 31 faces the inner peripheral surface of the sleeve 25 in the radial direction with a slight gap 300 interposed therebetween. Further, the diameter of the lower part of the shaft 31 gradually decreases toward the lower side. The shaft-supporting magnet 311 is fixed to the outer peripheral surface near the lower end part of the shaft 31 with an adhesive, for example. The shaft-supporting magnet 311 is disposed in an annular shape around the center axis 9. The outer peripheral surface of the shaft-supporting magnet 311 is a pole face in which the south pole and the north pole are arranged in the axial direction. The outer peripheral surface of the shaft-supporting magnet 311 faces the inner peripheral surface of the sleeve-supporting magnet 251 in the radial direction. This allows the shaft 31 including the shaft-supporting magnet 311 to be held to the sleeve 25 including the sleeve-supporting magnet 251 in a non-contacting manner, due to the attraction of the magnetic force between the outer peripheral surface of the shaft-supporting magnet 311 and the inner peripheral surface of the sleeve-supporting magnet 251. As a result, the rotating part 3 rotates stably when the motor 10 is driven.

The rotor hub part 32 is a member that spreads annularly around the shaft 31. The rotor hub part 32 has a hub top plate part 321 and a hub tubular part 322. The hub top plate part 321 is a part that is positioned above the stator 22, and extends annularly and radially outward from the vicinity of an upper end part of the shaft 31. A through hole 320 penetrating the rotor hub part 32 in the axial direction is provided in a radially inner part of the hub top plate part 321. A part of the shaft 31 near the upper end part thereof is press-fitted into the through hole 320 of the rotor hub part 32. Thus, the rotor hub part 32 is fixed to the shaft 31 axially above the insulator 43. Note, however, that the shaft 31 and the rotor hub part 32 may be fixed to each other by another method such as adhesion or shrink fitting. The hub tubular part 322 is a part that extends downward from the outer edge of the hub top plate part 321 in a substantially cylindrical shape. The hub tubular part 322 is substantially concentric with the center axis 9. An outer peripheral surface of the drive magnet 33 is fixed to an inner peripheral surface of the hub tubular part 322. The hub tubular part 322 supports the drive magnet 33. A magnetic material such as iron is used as the material of the rotor hub part 32. This makes it possible to keep the magnetic flux generated from the drive magnet 33 from escaping to the outside.

The drive magnet 33 is fixed to the inner peripheral surface of the hub tubular part 322 of the rotor hub part 32 with an adhesive, for example. The drive magnet 33 has a substantially cylindrical shape and is positioned on the radially outer side of the stator 22. The north pole and the south pole are magnetized alternately in the circumferential direction on the inner peripheral surface of the drive magnet 33. Further, the inner peripheral surface of the drive magnet 33 faces radially outer end faces of the multiple teeth 412 in the radial direction with a slight gap interposed therebetween. In other words, the drive magnet 33 has a pole face that faces the stator 22 in the radial direction. Note, however, that multiple magnets may be used instead of the substantially cylindrical drive magnet 33. In the case of using multiple magnets, the magnets may be placed on the inner peripheral surface of the hub tubular part 322 such that the pole face of the north pole and the pole face of the south pole are arranged alternately in the circumferential direction. The drive magnet 33 may be indirectly fixed to the hub tubular part 322 through an iron yoke.

In such a motor 10, when a drive current is supplied to the coils 42, a magnetic flux is generated in the multiple teeth 412 which are magnetic cores of the coils 42. Further, a magnetic circuit passing through the stator 22 and the drive magnet 33 is formed. Then, the action of the magnetic flux between the teeth 412 and the drive magnet 33 generates a circumferential torque between the stationary part 2 and the rotating part 3. As a result, the rotating part 3 rotates relative to the stationary part 2 around the center axis 9, through the later-mentioned aerodynamic bearing 4. In addition, the later-mentioned impeller 50 supported by the rotor hub part 32 rotates about the center axis 9 together with the rotating part 3.

The configuration of the aerodynamic bearing 4 will now be described. As described above, the stationary part 2 including the sleeve 25 and the rotating part 3 including the shaft 31 face each other in the radial direction with the slight gap 300 interposed therebetween. A gas such as air is interposed in the gap 300. Note, however, that a gas other than air or a mixture gas including air and a gas other than air may be interposed in the gap 300.

Figure 3:
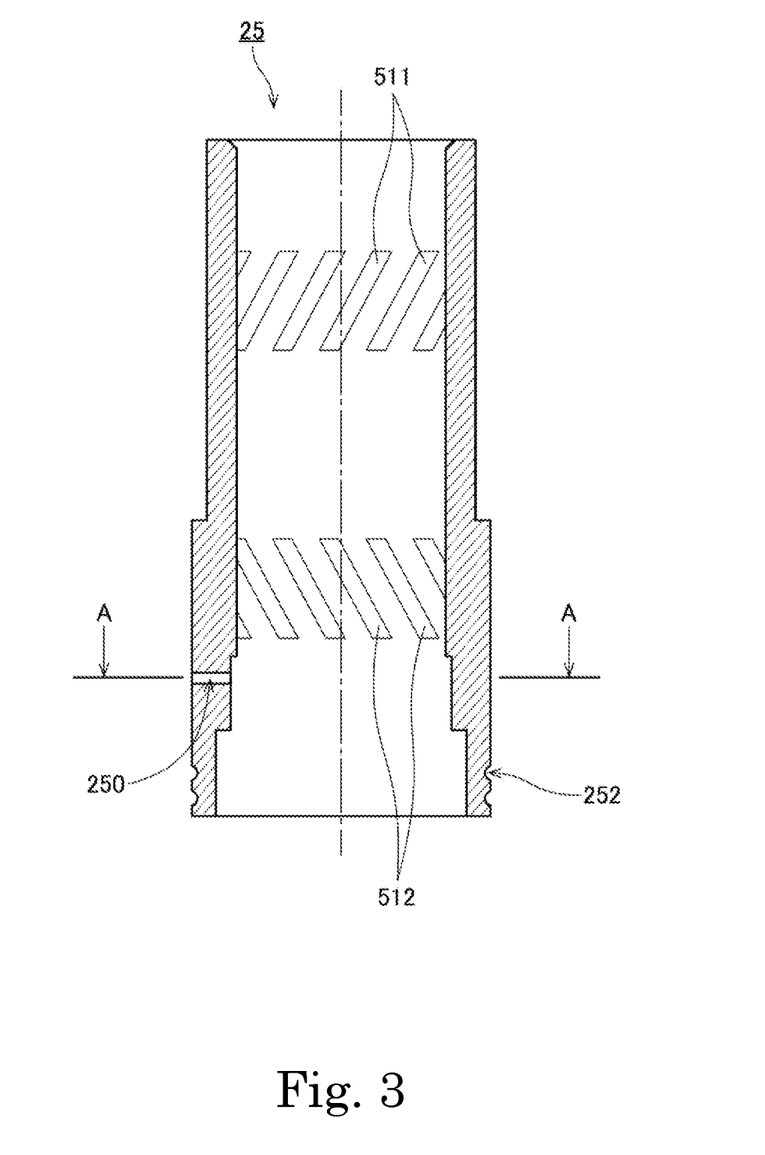
FIG. 3 is a longitudinal sectional view of a sleeve according to the first example embodiment of the present disclosure.

FIG. 3 is a longitudinal sectional view of the sleeve 25. As shown in FIG. 3, the inner peripheral surface of the sleeve includes an upper radial groove row 511 and a lower radial groove row 512. The upper radial groove row 511 and the lower radial groove row 512 are spaced apart from each other in the axial direction. The upper radial groove row 511 has multiple grooves tilted to one side in the circumferential direction toward the lower side. The multiple grooves are arranged parallel to each other. In addition, the lower radial groove row 512 has multiple grooves tilted to one side in the circumferential direction toward the upper side. The multiple grooves are arranged parallel to each other. Here, one side in the circumferential direction refers to the left side in FIG. 3, which is the same direction as the rotation direction of the rotating part 3 of the motor 10. Each of the upper radial groove row 511 and the lower radial groove row 512 may be a so-called herringbone-shaped groove row that is tilted to one side in the circumferential direction toward the center part in the axial direction. When the motor 10 is driven, gas flows into the gap 300 from the external space through the through hole 250 to increase pressure, and the upper radial groove row 511 and the lower radial groove row 512 induce dynamic pressure between the upper radial groove row 511 and the lower radial groove row 512 in the axial direction. This produces a radial supporting force between the sleeve 25 and the shaft 31.

That is, in the motor 10, the inner peripheral surface of the sleeve 25 and the outer peripheral surface of the shaft 31 face each other in the radial direction with the gap 300 including a gas interposed therebetween, to form a radial bearing part which is the aerodynamic bearing 4. Note that the upper and lower radial groove rows 511 and 512 are defined in at least one of the inner peripheral surface of the sleeve 25 and the outer peripheral surface of the shaft 31.

As described above, the aerodynamic bearing 4 is formed of the sleeve 25 in the stationary part 2, the shaft 31 in the rotating part 3, and the gas interposed in the gap 300 between the sleeve 25 and the shaft 31. The rotating part 3 is radially supported by the aerodynamic bearing 4, and rotates about the center axis 9 in a non-contacting manner. Further, due to the magnetic flux generated between the sleeve-supporting magnet 251 and the shaft-supporting magnet 311, the shaft 31 is axially held to the sleeve 25 in a non-contacting manner.

Next, the configuration of the impeller 50 and the housing 60 will be described.

The impeller 50 has an impeller cup 51 and multiple blades 52. The impeller cup 51 is fixed to an upper face of the hub top plate part 321 and an outer peripheral surface of the hub tubular part 322 of the rotor hub part 32. Each blade 52 spreads radially outward from the impeller cup 51. The multiple blades 52 are arranged at substantially equal intervals in the circumferential direction. The impeller cup 51 and the multiple blades 52 are formed of resin as one continuous member by injection molding, for example.

Note, however, that the impeller cup 51 and the multiple blades 52 may be formed of separate members made of different materials. The impeller cup 51 and the multiple blades 52 rotate about the center axis 9 together with the rotating part 3 of the motor 10.

Note that as a modification, the impeller 50 may be fixed directly to the shaft 31 with no rotor hub part 32 interposed therebetween. For example, the impeller 50 may have an impeller cup 51 fixed to an upper end part of the shaft 31 and spreading annularly around the shaft 31, and multiple blades 52 spreading radially outward from the impeller cup 51. In addition, the impeller 50 may support the drive magnet 33 by fixing the outer peripheral surface of the drive magnet 33 to an inner peripheral surface of the impeller cup 51 through an iron yoke.

The housing 60 extends axially in a tubular shape around the motor 10 and the impeller 50. The housing 60 houses the motor 10 and the impeller 50 on the radially inner side thereof. An outer peripheral surface of the base member 21 of the motor 10 is fixed to an inner peripheral surface of a lower part of the housing 60. That is, the base member 21 of the motor 10 forms a lower face of the fan motor 1. A radially inner space of the housing 60 is exposed to the outside through an opening 600 in an upper part of the housing 60. An exhaust port (not shown) axially penetrating the base member 21 is provided in a lower part of the housing 60.

As the impeller 50 rotates, gas is sucked into the space inside the housing 60 in the axial direction, through the opening 600. In addition, the gas sucked into the housing 60 is accelerated by the impeller 50, and flows axially downward through a wind tunnel between the impeller 50 and the housing 60. Thereafter, the gas passes through the exhaust port (not shown) of the base member 21 and is discharged to the outside of the housing 60. Note that as will be described later, a part of the gas sucked into the housing 60 flows into the gap 300 through the through hole 250 of the sleeve 25.

Next, a detailed configuration of the sleeve 25 and the insulator 43 will be described. The following description will be given by appropriately referring to FIGS. 1 to 3 together with later-mentioned FIGS. 4 to 6.

Figure 4:
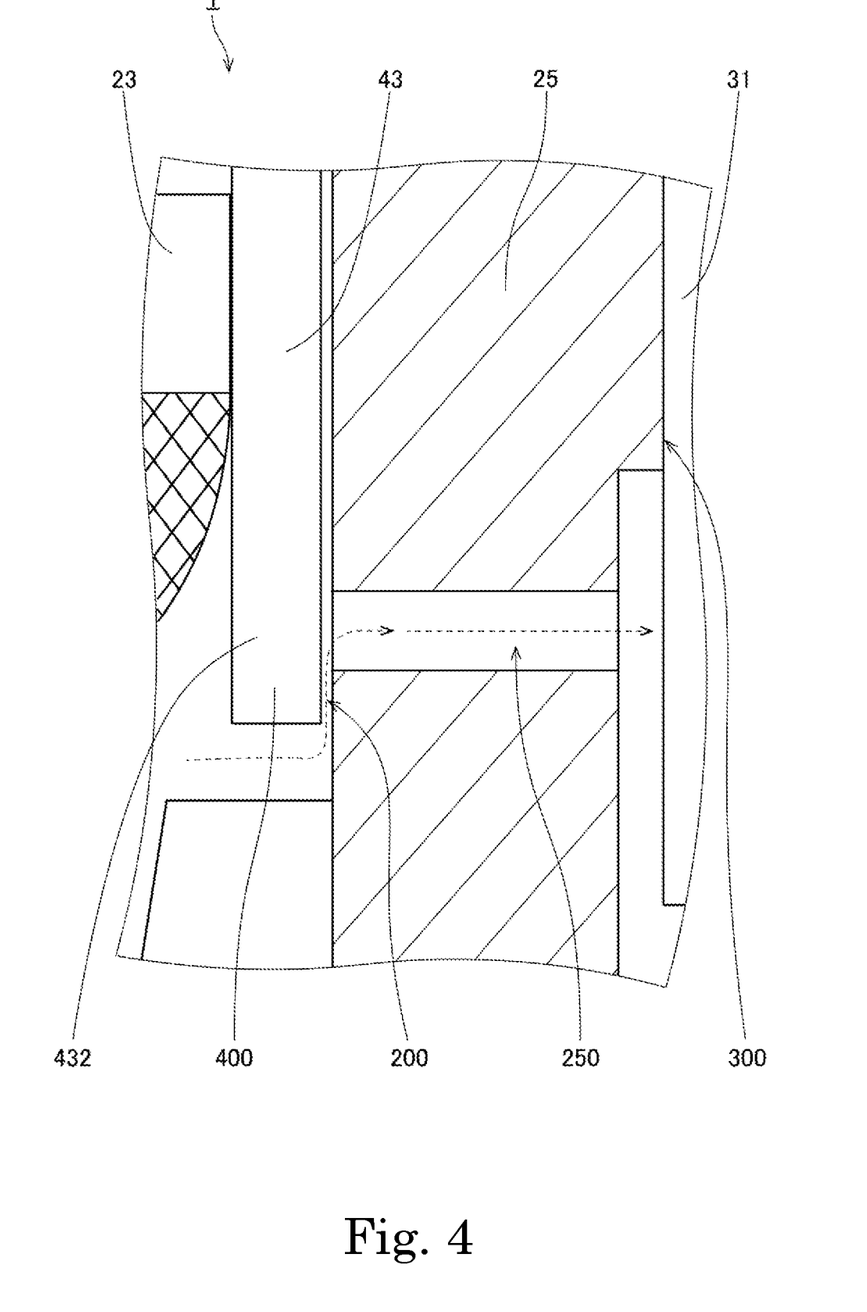
FIG. 4 is a partial longitudinal sectional view of the fan motor according to the first example embodiment of the present disclosure.

First, a detailed configuration of the insulator 43 will be described. As shown in FIG. 2, the insulator 43 of the example embodiment has an insulator main body 431 and an insulator lower protrusion 432. The insulator main body 431 is a part extending axially in a cylindrical shape on the radially outer side of the sleeve 25. The insulator main body 431 covers a part of the surface of the stator core 41. The insulator lower protrusion 432 is a part protruding downward from a part in the circumferential direction of a lower end part of the insulator main body 431. FIG. 4 is a partial longitudinal sectional view which is an enlargement of a part of the sleeve 25 in the fan motor 1 near the through hole 250. As shown in FIG. 4, the insulator lower protrusion 432 radially overlaps the through hole 250 with the gap 200 interposed therebetween, on the radially outer side of the through hole 250. As a result, the insulator lower protrusion 432 forms a wall part 400 that covers the through hole 250 on the radially outer side of the through hole 250. The through hole 250 and the wall part 400 face each other in the radial direction with the gap 200 interposed therebetween.

When the motor 10 is driven, gas flows into the radial gap 300 between the inner peripheral surface of the sleeve 25 and the outer peripheral surface of the shaft 31 from the external space, through a gap 200 on the radially inner side of the insulator lower protrusion 432 and the through hole 250 (see dotted arrow in FIG. 4). On the other hand, dust or water droplets located near the through hole 250 inside the motor 10 are shielded by the wall part 400, and are kept from entering the through hole 250. That is, the size of the gap 200 allows passage of a gas such as air composed of fine molecules, but limits passage of dust or water droplets. That is, by providing the wall part 400, dust or water droplets entering the interior of the motor 10 can be kept from entering the gap 300 forming the aerodynamic bearing 4 through the through hole 250. As a result, dust or water droplets can be kept from becoming resistances when the rotating part 3 rotates. In addition, corrosion or deterioration of the sleeve 25 and the shaft 31, for example, due to entry of dust or water droplets into the through hole 250 can be suppressed.

Further, in the example embodiment, the wall part 400 is formed by using the insulator 43 included in the stator 22. This makes it possible to secure sufficient magnetic space for the stator 22 for generating circumferential torque between the stator 22 and the rotating part 3, and sufficient space for disposing the aerodynamic bearing 4, the sleeve-supporting magnet 251, and the shaft-supporting magnet 311 for stably supporting the rotating part 3. Finally, it is possible to secure sufficient space for disposing the impeller 50. In addition, since a member for suppressing entry of dust or water droplets need not be provided separately from the stator 22, it is possible to reduce the size of the motor 10. Furthermore, in the example embodiment, the insulator lower protrusion 432 forming the wall part 400 protrudes from only a part of the insulator main body 431 in the circumferential direction. This makes it possible to ensure a larger area of the circuit board 23 than when the insulator main body 431 protrudes in a cylindrical shape with no insulator lower protrusion 432. Furthermore, it is possible to reduce the amount of resin of the insulator 43, which leads to downsizing of the motor 10 and reduction of manufacturing cost.

Note, however, that the structure of the insulator 43 is not limited to this. As described above, the insulator main body 431 may protrude in a cylindrical shape. That is, the insulator 43 may cover a part of the surface of the stator core 41, and axially extend in a cylindrical shape on the radially outer side of the sleeve 25. At least a part of the vicinity of a lower end part of the cylindrically extending insulator 43 forms the wall part 400 radially overlapping the through hole 250 with the gap 200 interposed therebetween, for example. In this case, even when the insulator 43 is shifted from the sleeve 25 in the circumferential direction, the state where the wall part 400 overlaps the radially outer side of the through hole 250 can be maintained. As a result, entry of dust or water droplets from the through hole 250 can be further suppressed. Accordingly, dust or water droplets entering the interior of the motor 10 can be kept from entering the gap 300 forming the aerodynamic bearing 4 through the through hole 250.

Note that as shown in FIG. 2, a lower end part of the binding pin 44 of the example embodiment is fixed to the circuit board 23 by soldering, at a position on the radially outer side of the wall part 400 formed by the insulator lower protrusion 432 where the binding pin 44 radially overlaps the through hole 250. Hence, particles such as impurities generated from solder 231 are blocked by the wall part 400, and are kept from entering the through hole 250. As a result, the particles can be kept from becoming resistances when the rotating part 3 rotates. In addition, corrosion or deterioration of the sleeve 25 and the shaft 31, for example, due to entry of the particles into the through hole 250 can be suppressed.

Further, as described above, the circuit board 23 is positioned axially above the through hole 250 of the sleeve 25. When the motor 10 is driven, gas such as air inside the motor 10 moves radially outward under the influence of centrifugal force. Accordingly, for example, pressure near a gap 202 which is a radially inner space inside the motor 10 (axial gap between upper face of sleeve 25 and lower face of radially inner end part of hub top plate part 321, see FIG. 1) is lower than pressure in a space on the radially outer side of the gap 202. On the other hand, in a lower part of the interior of the motor 10, the circuit board 23 spreading radially outward serves as a shield, and radially outward movement of gas such as air under the influence of centrifugal force is suppressed. Hence, pressure drop in a space near the radially outer side of the through hole 250, which is a space inside the motor 10 axially below and on the radially inner side of the circuit board 23 is suppressed. As a result, pressure in the space near the radially outer side of the through hole 250 becomes higher than the pressure near the gap 202. Accordingly, when the motor 10 is driven, air flows from the space near the radially outer side of the through hole 250, and passes through the through hole 250 to flow upward through the gap 300 and toward the vicinity of the gap 202. On the other hand, air is unlikely to flow from the vicinity of the gap 202, and flow downward through the gap 300 and the through hole 250 toward the space near the radially outer side of the through hole 250. Further, as described above, the space near the radially outer side of the through hole 250 is covered with the wall part 400. This makes it possible to keep dust or water droplets entering the interior of the motor 10 from entering the gap 300 forming the aerodynamic bearing 4, without providing a separate wall part covering the vicinity of the gap 202.

Figure 5:
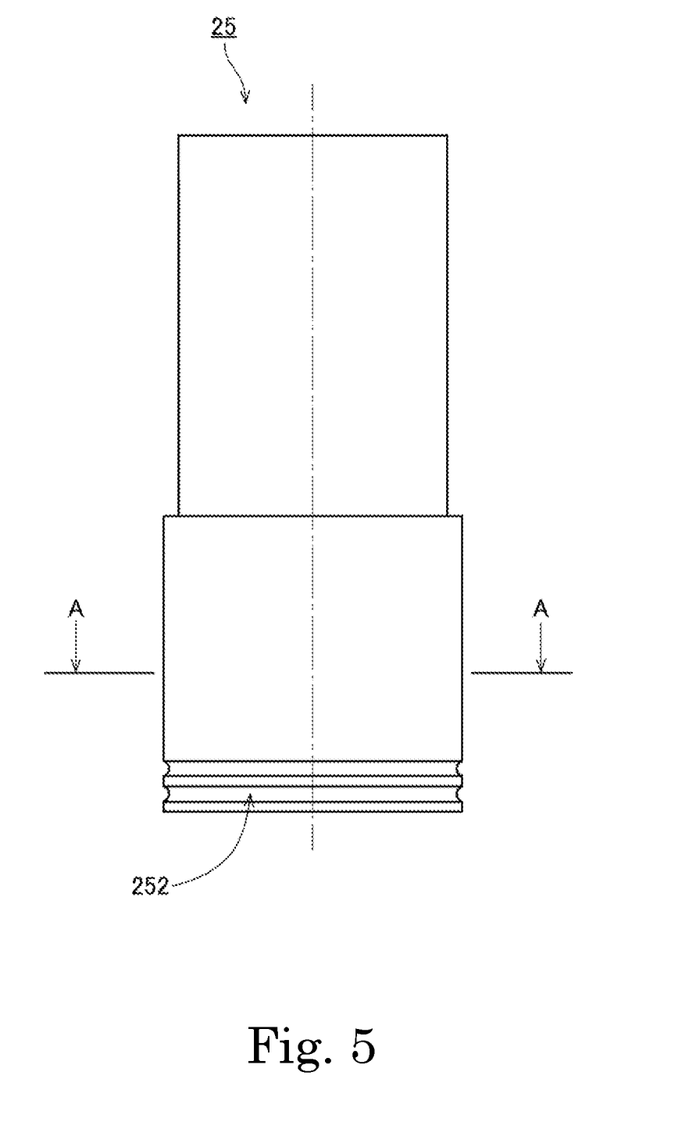
FIG. 5 is a side view of the sleeve according to the first example embodiment of the present disclosure.

Next, a detailed configuration of the sleeve 25 will be described. FIG. 5 is a side view of the sleeve 25. As shown in FIGS. 1 to 3 and 5, the sleeve 25 has a circumferential groove 252 that is recessed radially inward from the outer peripheral surface of the sleeve 25 over the entire circumference in the circumferential direction, axially below the through hole 250. At the time of manufacturing the fan motor 1, the base member 21 is formed of resin by injection molding in a state where the metal sleeve 25 having the circumferential groove 252 is disposed in a mold. Accordingly, after subjecting the resin to injection molding, a part of the resin material forming the base member 21 is positioned in the circumferential groove 252. As a result, the contact area between the base member 21 and the sleeve 25 increases, and the fixing strength increases. In addition, when an axial impact is applied to one of the base member 21 and the sleeve 25, axial misalignment between the base member 21 and the sleeve 25 can be suppressed. Note that he circumferential groove 252 may instead be recessed radially inward from the outer peripheral surface of the sleeve 25 only partially in the circumferential direction. In other words, the circumferential groove 252 may protrude radially outward from the outer peripheral surface of the sleeve 25, over the entire circumference in the circumferential direction, or in only a part in the circumferential direction.

Figure 6:
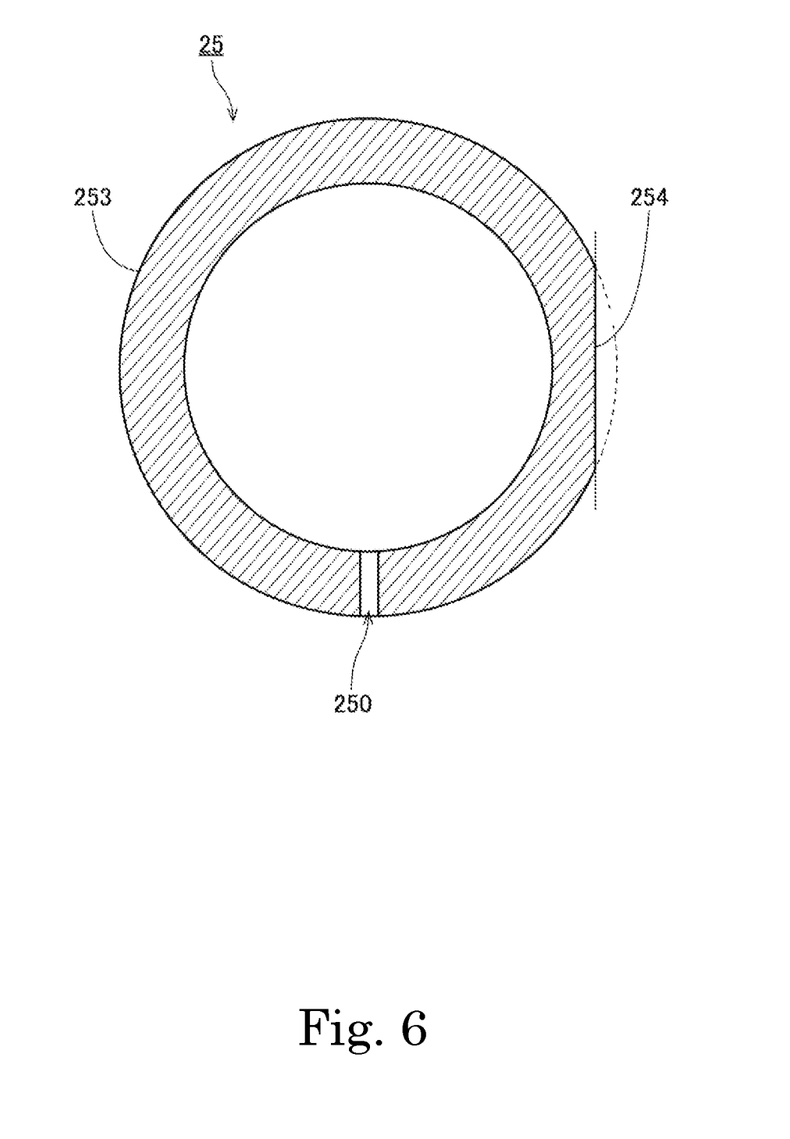
FIG. 6 is a cross-sectional view of the sleeve according to the first example embodiment of the present disclosure.

FIG. 6 is a cross-sectional view of the sleeve 25 taken along position A-A in FIGS. 3 and 5. As shown in FIG. 6, the outer peripheral surface of the sleeve 25 has an arcuate face 253 spreading in the circumferential direction, and a flat face 254 spreading perpendicularly to the radial direction. That is, in cross-sectional view of the sleeve 25, a so-called "D-cut shape" is formed. After the injection molding of the resin forming the base member 21 at the time of manufacturing the fan motor 1, a radially inner end face of the base member 21 comes into contact with both the arcuate face 253 and the flat face 254. As a result, when a circumferential impact is applied to one of the base member and the sleeve 25, circumferential misalignment between the base member 21 and the sleeve 25 can be suppressed.

Note that as shown in FIG. 6, the through hole 250 extends radially inward from the arcuate face 253 of the outer peripheral surface of the sleeve 25, and penetrates the sleeve 25 in the radial direction. That is, the through hole 250 and "the part where the D-cut shape is formed" which is a thinned part of the sleeve 25 are provided in different positions in the circumferential direction. This makes it possible to ensure sufficient strength of the sleeve 25, and to narrow the gap 200 between the through hole 250 and the wall part 400.

While exemplary embodiments of the present disclosure have been described above, the present disclosure is not limited to the example embodiments described above.

Figure 7:
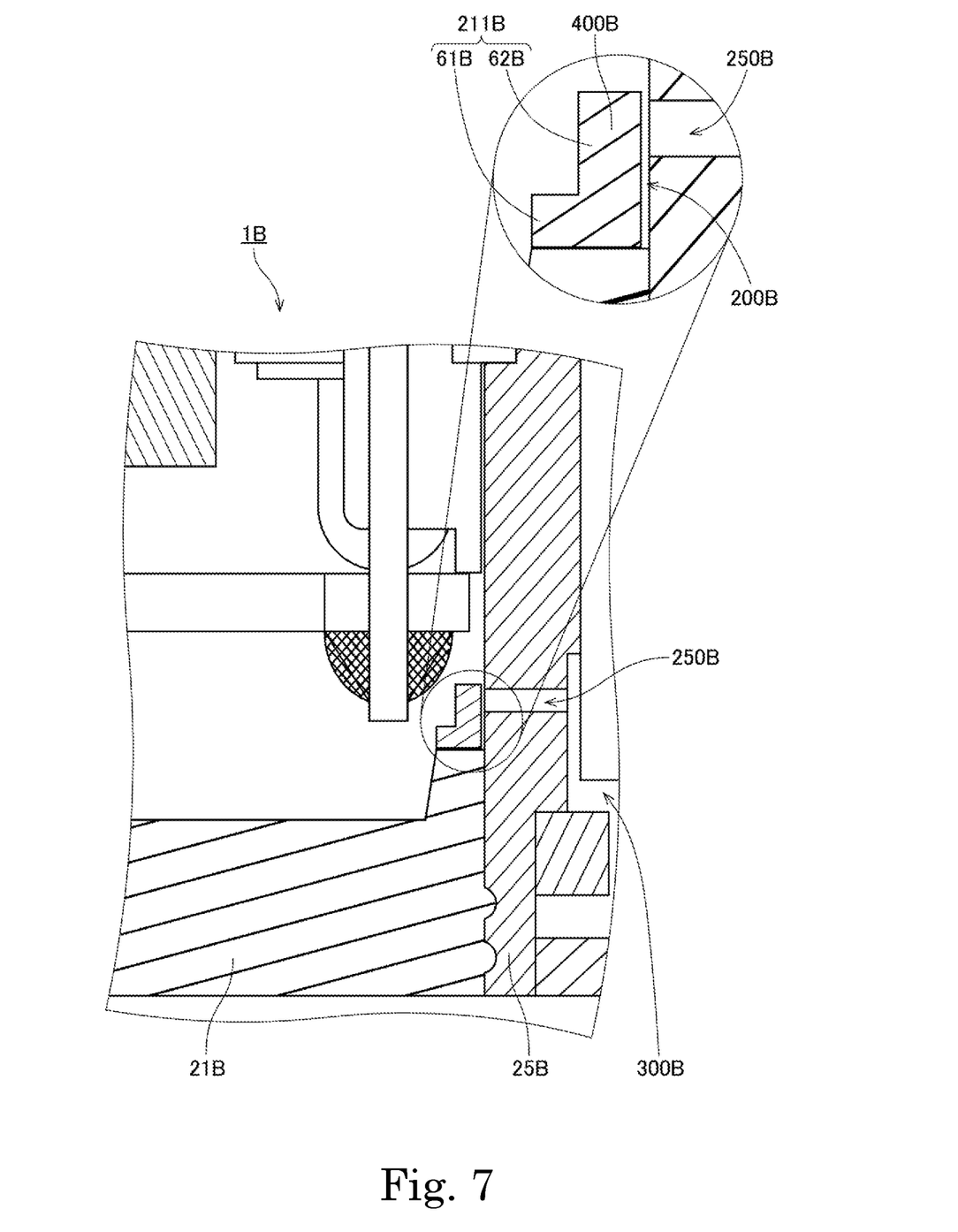
FIG. 7 is a partial longitudinal sectional view of a fan motor according to a modification of an example embodiment of the present disclosure.

In the example embodiment described above, the wall part 400 is formed by using the insulator 43. However, the member forming the wall part 400 is not limited to the insulator 43. FIG. is a partial longitudinal sectional view of a fan motor 1B according to a modification. In the example of FIG. 7, a ring member 211B is fixed to a part of the upper face of a radially inner end part of a base member 21B. The ring member 211B extends in a cylindrical shape along the center axis. Resin is used as the material of the ring member 211B, for example. The ring member 211B has a ring main body 61B and a ring protrusion 62B. The ring main body 61B extends axially in a cylindrical shape on the radially outer side of a sleeve 25B. The ring protrusion 62B protrudes upward from a part of an upper end part of the ring main body 61B in the circumferential direction. The ring protrusion 62B radially overlaps a through hole 250B with a gap 200B interposed therebetween, on the radially outer side of the through hole 250B. As a result, the ring protrusion 62B forms a wall part 400B that covers the through hole 250B from the radially outer side of the through hole 250B with the gap 200B interposed therebetween. Hence, dust or water droplets entering the interior of the motor can be kept from entering a gap 300B on the radially inner side of the sleeve 25B through the through hole 250B.

Figure 8:
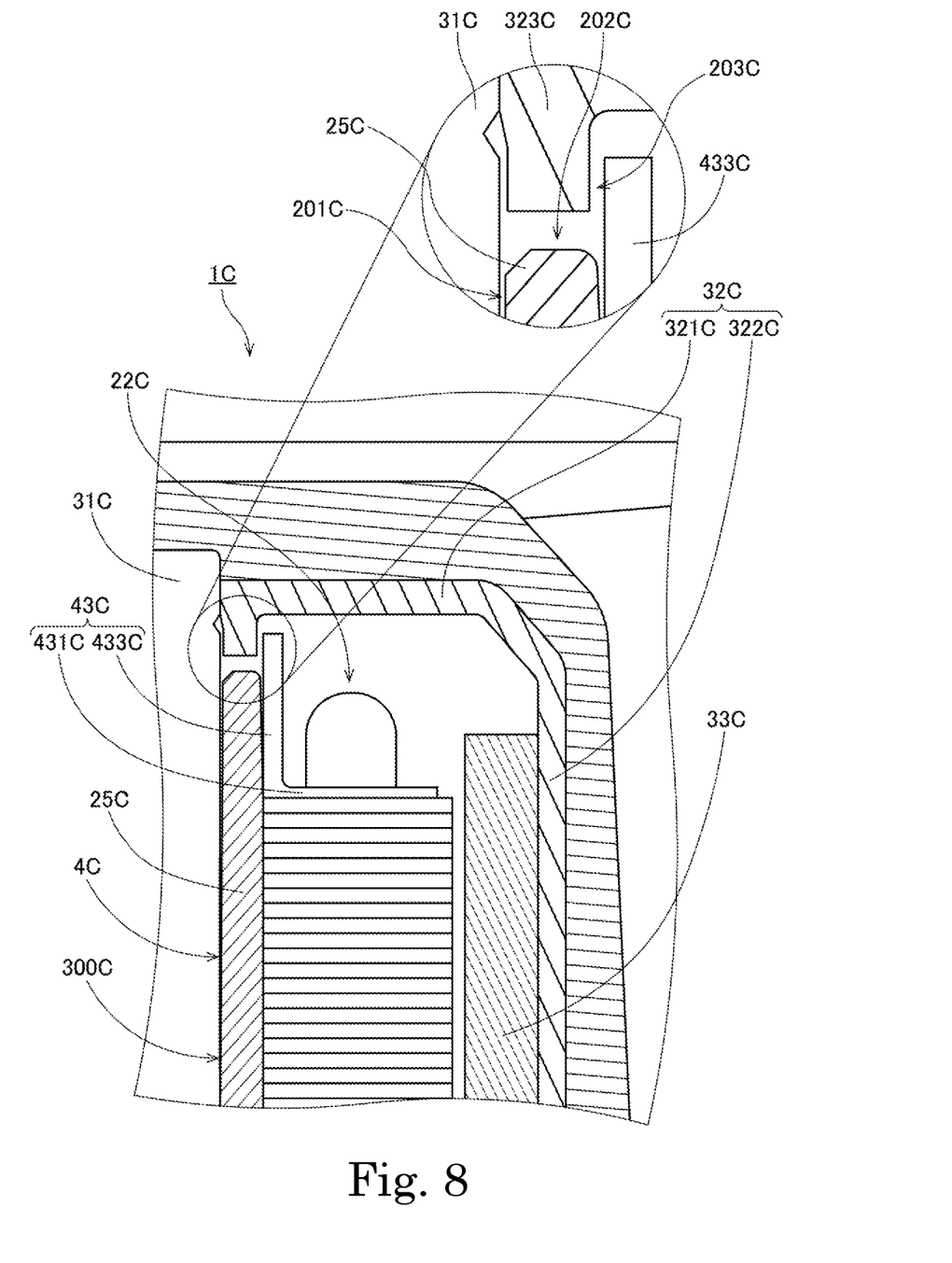
FIG. 8 is a partial longitudinal sectional view of a fan motor according to the modification of an example embodiment of the present disclosure.

FIG. 8 is a partial longitudinal sectional view of a fan motor 1C according to another modification. In the example of FIG. 8, a rotor hub part 32C further includes a hub hanging part 323C in addition to a hub top plate part 321C and a hub tubular part 322C. The hub hanging part 323C is a part extending downward from a part of the lower face of a radially inner end part of the hub top plate part 321C. Further, an insulator 43C of the modification has an insulator main body 431C and an insulator upper protrusion 433C. The insulator main body 431C is a part extending axially in a cylindrical shape on the radially outer side of a sleeve 25C. The insulator upper protrusion 433C is a part that protrudes upward from a part of an upper end part of the insulator main body 431C in the circumferential direction. Further, an upper end part of the insulator upper protrusion 433C is positioned axially above an upper end part of the sleeve 25C and a lower end part of the hub hanging part 323C.

At least a part including the lower end part of the hub hanging part 323C is positioned between an outer peripheral surface of a shaft 31C and the inner peripheral surface of the insulator upper protrusion 433C in the radial direction. A radial gap 201C between an outer peripheral surface of an upper part of the shaft 31C and an inner peripheral surface of an upper part of the sleeve 25C, an axial gap 202C between an upper face of the sleeve 25C and a lower face of the hub hanging part 323C, and a radial gap 203C between an outer peripheral surface of the hub hanging part 323C and the inner peripheral surface of the insulator upper protrusion 433C are continuous with one another and communicate into an external space of the motor and the fan motor. By forming such a so-called "labyrinth structure," dust or water droplets entering the interior of the motor can be kept from entering a gap 300C forming an aerodynamic bearing 4C through the gaps 201C to 203C.

Note that the hub hanging part 323C may be formed by members other than the rotor hub part 32C, such as a part of an impeller 50. In this case, the impeller 50 may have an impeller top plate part positioned above a stator 22C and spreading annularly in the radial direction, an impeller tubular part extending downward from the outer edge of the impeller top plate part in a substantially cylindrical shape and supporting a drive magnet 33C on an inner peripheral surface thereof, multiple blades each spreading radially outward from an outer peripheral surface of the impeller tubular part, and an impeller hanging part extending downward from a part of the lower face of a radially inner end part of the impeller top plate part. Here, the impeller hanging part corresponds to the hub hanging part 323C. At least a part including a lower end part of the impeller hanging part is positioned between an outer peripheral surface of the shaft 31C and an inner peripheral surface of the insulator upper protrusion 433C in the radial direction. A radial gap 201C between an outer peripheral surface of an upper part of the shaft 31C and an inner peripheral surface of an upper part of the sleeve 25C, an axial gap 202C between an upper face of the sleeve 25C and a lower face of the impeller hanging part, and a radial gap 203C between an outer peripheral surface of the impeller hanging part and the inner peripheral surface of the insulator upper protrusion 433C may be continuous with one another and communicate into an external space of the motor and the fan motor to form a "labyrinth structure." Accordingly, dust or water droplets entering the interior of the motor can be kept from entering a gap 300C forming an aerodynamic bearing 4C through the gaps 201C to 203C.

Note that detailed shapes of the motor and the fan motor may differ from the structures and shapes shown in the accompanying drawings of the present disclosure.

The present disclosure is applicable to a motor and a fan motor, for example.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor comprising:
a stationary portion including a stator; and
a rotating portion supported so as to be rotatable about a vertically extending center axis relative to the stationary portion through an aerodynamic bearing; wherein
the rotating portion includes:
a shaft disposed along the center axis; and
a magnet facing the stator;
the stationary portion includes:
a sleeve including an outer peripheral surface on which the stator is fixed directly or indirectly, and extending axially in a cylindrical shape around the shaft;
in the aerodynamic bearing, an outer peripheral surface of the shaft and an inner peripheral surface of the sleeve surface oppose each other in a radial direction;
a through hole penetrates the sleeve in the radial direction;
a space on a radially inner side of the sleeve communicates with an external space of the motor through the through hole; and
the stationary portion includes a wall portion radially overlapping the through hole with a gap interposed therebetween on a radially outer side of the through hole;
the through hole is overlapped by the wall portion when viewed along the radial direction;
the gap is located between the through hole and the wall portion; and
a total radial width of the gap at a position adjacent to an opening of the through hole in the radial direction is narrower than an inner diameter of the through hole.

2. The motor according to claim 1, wherein the stator includes:
a stator core including a plurality of teeth protruding radially outward;
a plurality of coils including wires wound around the plurality of teeth; and
a binding pin to which an end portion of the wire is tied;
the stationary portion further includes a circuit board positioned below the stator and electrically connected to the stator; and
the binding pin is fixed to the circuit board at a position where the binding pin radially overlaps the through hole.

3. The motor according to claim 2, wherein the circuit board is positioned axially above the through hole.

4. The motor according to claim 2, wherein the outer peripheral surface of the sleeve includes:
an arcuate surface extending in a circumferential direction; and
a flat surface extending perpendicular to the radial direction;
the stationary portion includes a base extending radially below the stator or the circuit board; and
the base is in contact with both the arcuate surface and the flat surface.

5. The motor according to claim 1, wherein the outer peripheral surface of the sleeve includes:
an arcuate surface extending in a circumferential direction; and
a flat surface extending perpendicular to the radial direction; and
the through hole extends radially inward from the arcuate surface.

6. The motor according to claim 4, wherein
the sleeve includes a circumferential groove recessed radially inward from the outer peripheral surface of the sleeve over an entire circumference or a portion in the circumferential direction; and
a portion of a material of the base is positioned in the circumferential groove.

7. The motor according to claim 1, wherein the stator includes:
a stator core including a plurality of teeth protruding radially outward;
an insulator covering a portion of a surface of the stator core; and a plurality of coils including wires wound around the plurality of teeth through the insulator;

the insulator includes:

an insulator main body covering a portion of a surface of the stator core and extending axially in a cylindrical shape on a radially outer side of the sleeve; and an insulator protrusion protruding downward from a portion of a lower end of the insulator main body in the circumferential direction; and the insulator protrusion defines the wall portion.

8. The motor according to claim 1, wherein the stator includes:

a stator core including a plurality of teeth protruding radially outward;

an insulator covering a portion of a surface of the stator core and extending axially in a cylindrical shape on a radially outer side of the sleeve; and a plurality of coils including wires wound around the plurality of teeth through the insulator; and a portion of the insulator defines the wall portion.

9. The motor according to claim 4, further comprising a ring fixed to a portion of an upper surface of the base and extending in a cylindrical shape along the center axis; wherein the ring includes:

a ring main body extending axially in a cylindrical shape on a radially outer side of the sleeve; and a ring protrusion protruding upward from a portion of an upper end of the ring main body in the circumferential direction; and the ring protrusion defines the wall portion.

10. The motor according to claim 1, wherein the stator includes:

a stator core including a plurality of teeth protruding radially outward;

an insulator positioned on a radially outer side of the sleeve and covering a portion of a surface of the stator core; and a plurality of coils having wires wound around the plurality of teeth through the insulator;

the rotating portion includes a rotor hub portion supporting the magnet, fixed to the shaft axially above the insulator, and annularly extending around the shaft;

the rotor hub portion includes:

an annular hub top plate portion positioned above the stator;

a hub tubular portion extending downward from an outer edge of the hub top plate portion in a cylindrical shape and supporting the magnet; and a hub hanging portion extending downward from a portion of a lower surface of the hub top plate portion;

at least a portion including a lower end portion of the hub hanging portion is positioned between an outer peripheral surface of the shaft and an inner peripheral surface of the insulator, in the radial direction; and a radial gap between the outer peripheral surface of the shaft and an inner peripheral surface of the sleeve, an axial gap between an upper surface of the sleeve and a lower surface of the hub hanging portion, and a radial gap between an outer peripheral surface of the hub hanging portion and the inner peripheral surface of the insulator are continuous with one another to define a labyrinth structure.

11. A fan motor comprising:

the motor according to claim 1;

an impeller cup supporting the magnet, fixed to the shaft, and extending annularly around the shaft; and an impeller including a plurality of blades extending radially outward from the impeller cup; wherein the stator includes:

a stator core including a plurality of teeth protruding radially outward;

an insulator positioned on the radially outer side of the sleeve and covering a portion of a surface of the stator core; and a plurality of coils including wires wound around the plurality of teeth through the insulator;

the impeller includes:

an annular impeller top plate portion positioned above the stator;

an impeller tubular portion extending downward from an outer edge of the impeller top plate portion in a cylindrical shape and supporting the magnet; and an impeller hanging portion extending downward from a portion of a lower surface of the impeller top plate portion;

at least a portion including a lower end of the impeller hanging portion is positioned between an outer peripheral surface of the shaft and an inner peripheral surface of the insulator in the radial direction; and a radial gap between the outer peripheral surface of the shaft and an inner peripheral surface of the sleeve, an axial gap between an upper surface of the sleeve and a lower surface of the impeller hanging portion, and a radial gap between an outer peripheral surface of the impeller hanging portion and the inner peripheral surface of the insulator are continuous with one another to define a labyrinth structure.

12. A fan motor comprising:

the motor according to claim 1;

an impeller cup supporting the magnet, fixed to the shaft, and fixed to a rotor hub portion annularly extending around the shaft; and an impeller including a plurality of blades extending radially outward from the impeller cup.

* * * * *